United States Patent
Chaloux et al.

(10) Patent No.: US 10,691,922 B2
(45) Date of Patent: Jun. 23, 2020

(54) DETECTION OF COUNTERFEIT ITEMS BASED ON MACHINE LEARNING AND ANALYSIS OF VISUAL AND TEXTUAL DATA

(71) Applicant: ACCENTURE GLOBAL SOLUTIONS LIMITED, Dublin (IE)

(72) Inventors: Julianne Madeleine Chaloux, Dublin (IE); Jeremiah Patrick Hayes, Dublin (IE); Mohit Aggarwal, Dublin (IE); Penelope Daphne Tsatsoulis, Dublin (IE)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 159 days.

(21) Appl. No.: 15/982,435

(22) Filed: May 17, 2018

(65) Prior Publication Data

US 2019/0354744 A1    Nov. 21, 2019

(51) Int. Cl.
| | |
|---|---|
| *G06K 9/00* | (2006.01) |
| *G06N 5/04* | (2006.01) |
| *G06N 20/00* | (2019.01) |
| *G06F 16/58* | (2019.01) |
| *G06F 16/951* | (2019.01) |
| *G06F 16/33* | (2019.01) |
| *G06F 40/279* | (2020.01) |

(52) U.S. Cl.
CPC ..... *G06K 9/00201* (2013.01); *G06F 16/3334* (2019.01); *G06F 16/58* (2019.01); *G06F 16/951* (2019.01); *G06F 40/279* (2020.01); *G06N 5/046* (2013.01); *G06N 20/00* (2019.01)

(58) Field of Classification Search
CPC . G06K 9/00201; G06F 16/3334; G06F 16/58; G06F 16/951; G06F 40/279; G06N 20/00; G06N 5/046
See application file for complete search history.

(56) References Cited

U.S. PATENT DOCUMENTS

| | | | | |
|---|---|---|---|---|
| 2015/0371300 | A1* | 12/2015 | Deyle | G06Q 10/0833 705/26.35 |
| 2017/0161753 | A1* | 6/2017 | McKinnon | G06Q 30/0185 |
| 2018/0189359 | A1* | 7/2018 | Jenkins | G06N 20/00 |
| 2019/0188729 | A1* | 6/2019 | Mao | G06K 9/6267 |

* cited by examiner

*Primary Examiner* — Leon Flores
(74) *Attorney, Agent, or Firm* — Mannava & Kang, P.C.

(57) ABSTRACT

A system detecting counterfeit items based on machine learning and analysis of visual and textual data is disclosed. The system may comprise a data access interface to receive product data associated with a protected product from a user device. The product data may comprise multimodal data that describes the protected product. The system may also comprise a search term generator to generate search terms based on the received product data. The system may comprise a processor to identify one or more potential counterfeit items from the at least one web source using a crawling technique to obtain data associated with to similar products from the at least one web source, identifying at least one match for similar products, and using image processing and analysis to determine if the at least one match for similar products comprises at least one or more potential counterfeit items. The system may also generate a takedown notice to the at least one web source if a user confirms the one or more potential counterfeit is items.

21 Claims, 11 Drawing Sheets

DETECTION OF COUNTERFEIT ITEMS BASED ON MACHINE LEARNING AND ANALYSIS OF VISUAL AND TEXTUAL DATA

TECHNICAL FIELD

This patent application relates generally to machine learning and digital image and textual processing, and more specifically, to systems and methods for detecting counterfeit items based on machine learning and analysis of visual and textual data.

BACKGROUND

The counterfeiting industry has become an increasingly growing problem throughout the world. Financial estimates suggest that sales in the counterfeit market has reached close to half a trillion USD. From toys to clothing to accessories to pharmaceuticals, counterfeit items pose a serious threat to individuals, organizations, and overall society. Counterfeit items, for instance, negatively impact sales of legitimate brands and companies, as well as devastate some countries altogether by stifling taxation revenue. It can also violate a number of health and safety standards for consumers.

Detecting a counterfeit item in the open market, however, is not an easy task. One of the most common ways to detect a counterfeit item involves examining the general appearance of that item and comparing it to an original. For example, something that is counterfeit may have a color that is "off" or a finish that is inexact to the true and lawfully-branded item. The material of a counterfeit item may also feel different or a logo or recognizable emblem on the counterfeit may be slightly misprinted or inexactly replicated. Examining these and other general appearance characteristics may be helpful in identifying a counterfeit item. That said, some counterfeit items are so deftly copied that it may be difficult to ascertain its authenticity, or lack thereof, using only the naked eye. Accordingly, one technical problem associated with detecting a counterfeit item is identifying attributes or characteristics of a counterfeit item and comparing them to a legitimate original, especially when the counterfeit is a higher quality replication.

With increased globalization, the counterfeit market has also become more and more sophisticated. For example, while still very popular, counterfeit dealers do not always use traditional controlled online web markets (e.g., consumer marketplace websites). There is a trend where dealers are turning to alternative platforms (e.g., mobile chat forums) to bypass traditional rules or conduct restrictions and transactions in order to make their counterfeit offerings less detectable. Therefore, another technical problem associated with conventional techniques is detection of counterfeit items on various kinds of web sites or forums for sales.

As the counterfeit market continues to expand its reach, it is imperative to find ways to identify or deter such practices. As a result, a more robust approach for detection of counterfeit items may be needed to better protect individuals and organizations to combat the negative and harmful effects of counterfeiting.

BRIEF DESCRIPTION OF DRAWINGS

Features of the present disclosure are illustrated by way of example and not limited in the following Figure(s), in which like numerals indicate like elements, in which.

DETAILED DESCRIPTION

Figure 1:
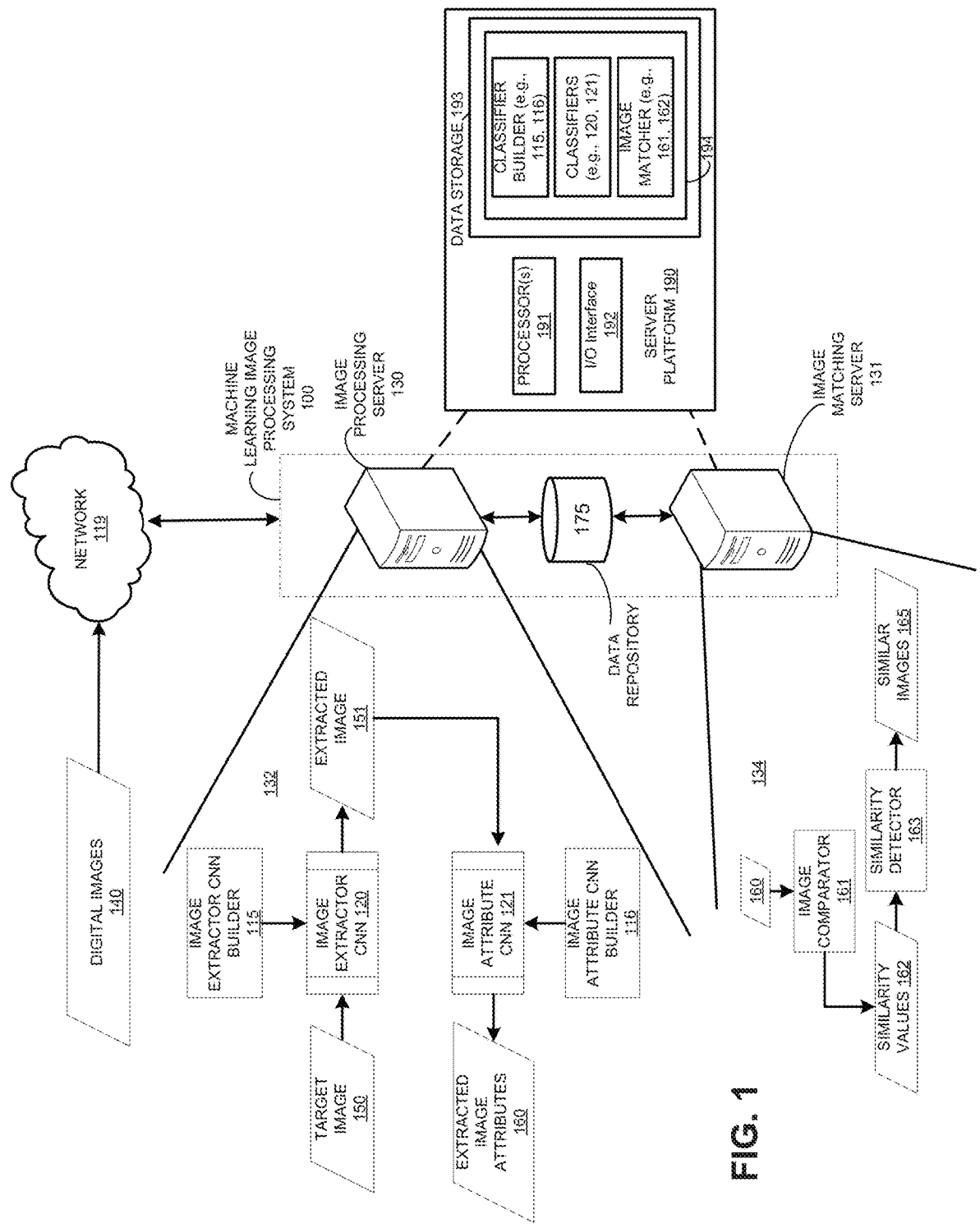
FIG. 1 illustrates an image processing system for counterfeit detection, according to an example.

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Branding is built upon value and trustworthiness. Unfortunately, counterfeit items reap the benefits and efforts that others put into creating value in such brands. As discussed above, the counterfeiting industry is harmful to individuals, organizations, and overall society, and its effects are growing at alarming rates. As a result, a more comprehensive approach for detection of counterfeit items may be needed to better protect individuals and organizations to combat the negative and harmful effects of counterfeiting.

As described herein, improved techniques in machine learning and analysis of visual and textual data may be provided to better detect counterfeit items on various websites or forums that offer counterfeit goods for sale. One aspect to better detection of counterfeit items may involve processing digital visual and textual data.

Digital image processing may involve processing a digital image, for example, from a digital still image or digital video, to ascertain, detect, and/or classify particular features or objects in the image. This may also include processing metadata associated with that digital image. Pattern recognition may be applied during image processing to detect a particular object or pattern in the image. Different types of conventional machine learning functions may be used for pattern recognition.

A machine learning processing system, according to various examples, may build and train multiple machine learning classifiers, such as convolutional neural networks (CNNs). The machine learning classifiers may perform image/textual processing to detect particular attributes of interested images/text. Such attributes may be used for image/textual matching to identify visually or textually similar content. It should be appreciated that "visual" or "image" data, as described herein, may also include textual data, audio data, or video data as well. In other words, "visual data processing" or "image processing," as used herein, may include, without limitation, processing and analysis of multimodal information. For example, this may include processing of textual, audio, video, or other similar data in addition to the actual visual or image data.

Referring back to convolutional neural networks (CNNs), CNNs may include many layers to detect and classify particular features of images relevant for a problem in hand. Furthermore, each layer of the CNN may have a multitude of parameters associated with it. Specific values of those parameters for a successful and accurate image classification may not be known a priori. The machine learning image processing system, according to various examples, may provide a method for building and training CNNs to output an accurate classification of an image.

Multiple CNNs may be built and trained by a machine learning image processing system. According to an example, a CNN built and trained by a machine learning image processing system may include an image attribute CNN. The image attribute CNN may identify and determine one or more attributes of an image. In an example, attributes of an image may be compared to attributes of stored images to find similar images in an image matching process. The attributes may be high-level abstractions represented by vectors of numeric values that may include visual features of an image, as well as any associated text, audio, or other multimodal data. This may be particular helpful in identifying counterfeit items using image processing and analysis.

As discussed in more detail herein, the image attribute CNN may be able to identify particular attributes of the target image which may be used for image matching. This may be particular helpful in identifying and detecting counterfeit items using image processing and analysis. Furthermore, the image attribute CNN may operate in real-time or near real-time to facilitate accurate image matching of objects from a target image. Accordingly, together with natural language processing (NLP) and/or other processing techniques, a machine learning image processing system may be used to combat nefarious effects of the counterfeit industry.

FIG. 1 illustrates an image processing system 100 for counterfeit detection, according to an example. The system 100 may be referred to as machine learning system because it may use machine learning functions to generate classifiers to make predictions on images, text, audio, video, or other multimodal data.

Various classifiers may be created and/or used in the system 100. For example, these may include CNNs. It should be appreciated that the system 100 may include additional components and that one or more of the components described herein may be removed and/or modified without departing from a scope of the system 100. Referring back to FIG. 1, the system 100 may include at least an image processing server 130, an image matching server 131, and a data repository 175.

The system 100, for example, may receive digital images 140 (e.g., from a user via a user device or other data source). The digital images 140 may be stored in the data repository 175. The digital images 140 may be received via communications network 119. The digital images 140 may be provided in various types of files, e.g., JPG, GIF, TIFF, PNG, BMP, or other file type. The digital images 140 may also be provided in textual, audio, digital video, or other multimodal formats and file types. In one example, digital images 140 may be generated from one or more frames of digital video. The digital images 140 may be provided by any number of data sources.

The communications network 119 may include local area networks (LANs) and wide area networks (WANs), such as the Internet. The communications network 119 may include signal bearing mediums that may be controlled by software, applications, platforms, layers, and/or logic. The communications network 119 may include a combination of network elements to support data communication services. The communications network 119 may encompass wired and/or wireless network technologies.

Examples of operations performed by the image processing server 130 are shown at section 132. Here, the image processing server 130 may include an image extractor CNN builder 115 that builds image extractor CNN 120. Image extraction may be useful in situations where an image to be considered for matching does not take up an entire frame of the image file. For example, if a wristwatch is of interest (e.g., for counterfeit identification and matching), but the only image available is of a group of people, one of whom is wearing that wristwatch of interest, image extraction may be used in this scenario to isolate and identify that wristwatch for image matching and/or counterfeit identification.

Referring back to 132, test data sets and validation sets may be created, for example, from the digital images 140 or other digital images, and may be used to build and validate the image extractor CNN 120. The image extractor CNN 120, for example, may be trained to identify classes (e.g., categories) of objects in digital images and locations of the objects in the digital images. The training data for the image extractor CNN 120 may include digital images, each having one or more objects, a class for each object, and a bounding box (e.g., size and location of bounding box) identifying the location of each object in the digital image.

After building the image extractor CNN 120, the image extractor CNN 120 may be used to identify objects in digital images. Target image 150 may be a digital image provided as input to the image extractor CNN 120, and the image extractor CNN 120 may make a prediction as to whether the target image 150 contains an object in one of the classes for which it was trained. If the image extractor CNN 120 generates a prediction that indicates the target image 150 contains an object in one of the classes, the image extractor CNN 120 may identify a bounding box in the target image 150 that surrounds the object. The target image 150 may be cropped around the bounding box, and the resulting image may be saved as the extracted image 151.

In some examples, an image attribute CNN builder 116 may build an image attribute CNN 121. Test data sets and validation sets may be created, for example, from the digital images 140 or other digital images, and may be used to build and validate the image attribute CNN 121. Building and validating the image attribute CNN 121 may be further described below. In some examples, the image attribute CNN 121 may be trained to identify classes (e.g., categories) of digital images.

After building the image attribute CNN 121, the image attribute CNN 121 may be used to determine attributes of images classified by the image attribute CNN 121. For example, the extracted image 151 may be provided as input to the image attribute CNN 121. Input images may also come from a variety of other data sources. The image attribute CNN 121 may generate a prediction of whether the extracted image 151 is in a class for which it was trained. However, instead of using the prediction generated by the image attribute CNN 121, the image processing server 130 may determine attributes (e.g., shown as extracted image attributes 160) of the extracted image 151 determined by an intermediate layer of the image attribute CNN 121 during its analysis of the extracted image 151 to generate the prediction. For example, the image attribute CNN 121 may be comprised of multiple convolutional layers, fully connected layers, and a binarized sigmoidal layer. Other various examples may also be provided.

In one example, a fully connected layer may compute the output as:

$$Y=FC(X)=W*X+B, \text{ where}$$

X may represent the output of the previous layer, a matrix of m*1 values; W may represent the weight parameter of the layer, a matrix of n*m values; B may represent a bias parameter of the layer, a matrix of n*1 values; and Y may represent the output of the fully connected layer, a matrix of n*1 values.

This output may be an input of the following rectified linear unit (RELU) layer:

$$y=RELU(x)=0 \text{ if } x<0; y=RELU(x)=x \text{ if } x>=0, \text{ where}$$

each element of the matrix X may be referred to as an element x. The output of the RELU layer may be a matrix of the same dimension as the input, e.g., a matrix of n*1 values in the range of [0,+∞). The output of the RELU layer may then be an input of the binarized sigmoidal layer, which may generate a value of 0 or 1 for each attribute of multiple attributes of the extracted image. The sigmoidal layer may compute the output as sigmoid(x)=1/(1+exp(-x)) for each input element x. The input element x may include values determined from a matrix that is output from a previous layer of the image CNN 121, for example, the RELU layer explained above.

The output value of the sigmoidal layer may be a matrix of n*1 values in the range of (0,1). The output matrix may then binarized by applying a threshold: y=0 if x<threshold; y=1 if x>=threshold.

The extracted image attributes 160 may include the values for the attributes determined by the sigmoidal layer of the image attribute CNN 121. The extracted image attributes 160 may be stored in the data repository 175 and may be used by the image matching server 131 to identify similar images, as is further described below.

Examples of operations performed by the image matching server 131 are shown at section 134. The image matching server 131 may compare the extracted image 151 to other images to identify images that are similar to the extracted image 151. This may be particularly useful in counterfeit detection, as described herein. Attributes of the images may be compared to determine how similar the images are to each other. The images being compared to the extracted image 151 and/or image data for those images, including their attributes, may be stored in the data repository 175. The image matching server 131 may include an image comparator 161 that compares the extracted image attributes 160 to image attributes of other images, for example, stored in the data repository 175, to identify similar images. The output of the image comparator 161 may include similarity values 162 that represent an amount of similarity between the extracted image attributes 160 and the attributes of other images being compared to the extracted image 151.

In an example, to determine similarity between the extracted image attributes 160 and attributes of another image, a Hamming distance may be calculated. The Hamming distance is an example of a similarity value of the similarity values 162. A similarity detector 163 may determine from the similarity values 162 a set of one or similar images 165 that are visually similar to the extracted image 151. For example, images associated with the "n" smallest Hamming distances may be identified as images visually similar to the extracted image 151, where "n" is an integer greater than or equal to 1. Determining the similar images 165 that are the most similar to the extracted image 151 may be used for a variety of applications, such as for counterfeit detection, facial recognition, vehicle detection, license plate detection, content delivery, etc. In another example, similar images but not exact images may be identified by the image matching server 131, as is further discussed below. Although Hamming distance is described herein, it should be appreciated that other statistical or mathematical determinations for image comparisons may also be used or provided.

Server platform 190 may be an example of hardware that may be used in the image processing server 130, image matching server 131, or other servers described herein. It should be appreciated that the server platform 190 may include additional components and that one or more of the components described herein may be removed and/or modified as is known to one of ordinary skill in the art.

The server platform 190 may include one or more processors 191, data storage 193, and an input/output (I/O) interface 192. The components of the server platform 190 may be shown on a single computer or server as an example and in other examples the components may exist on multiple computers or servers. The server platform 190 may store data in the data storage 193 and/or may manage the storage of data stored in a separate computing device, for instance, through the I/O interface 192. The data storage 193 may include physical memory, a hard drive, an optical drive, a flash drive, an array of drives, or any combinations thereof, and may include volatile and/or non-volatile data storage. Other variations or options may also be provided.

The processor 191 may perform various processing functions of the respective server. In some examples, the processor 191 may comprise at least a microprocessor, a microcontroller, an application specific integrated circuit (ASIC), Graphical Processing Unit (GPU), or other similar processing element. The processing functions may include classifier building functions, such as those performed by image extractor CNN builder 115 and image attribute CNN builder 116, image matching functions, such as those performed by the image comparator 161 and the similarity detector 163, as well as other associated functions. The processing functions performed by the image processing server 130 and the image matching server 131, and other functions, operations, and/or methods described herein may be embodied as machine-readable instructions 194 that may be stored in a non-transitory computer readable medium, such as the data storage 193, and executed by a processor, such as processor 191. In addition to storing the machine-readable instructions 194, the data storage 193 may store data or functions, such as classifiers which may include image extractor CNN 120 and image attribute CNN 121. The image processing server 130 and the image matching server 131 may also be shown as separate servers. However, the functions and operations of these servers may be performed on a single server or multiple servers which may be connected via a network.

It should be appreciated that the I/O interface 192 may include a hardware and/or a software interface. The I/O interface 192 may also be a network interface connected to a network through a network device, such as a router. For example, the I/O interface 192 may be a wireless local area network (WLAN) or a network interface controller (NIC). The WLAN may link to the network device through a radio signal. Similarly, the NIC may link to a network device through a physical connection, such as a cable. It should be appreciated that the data repository 175 may include a database comprised of database tables or another type of data storage system. The data repository 175 may also be implemented as a standalone or distributed repository.

Figure 2:
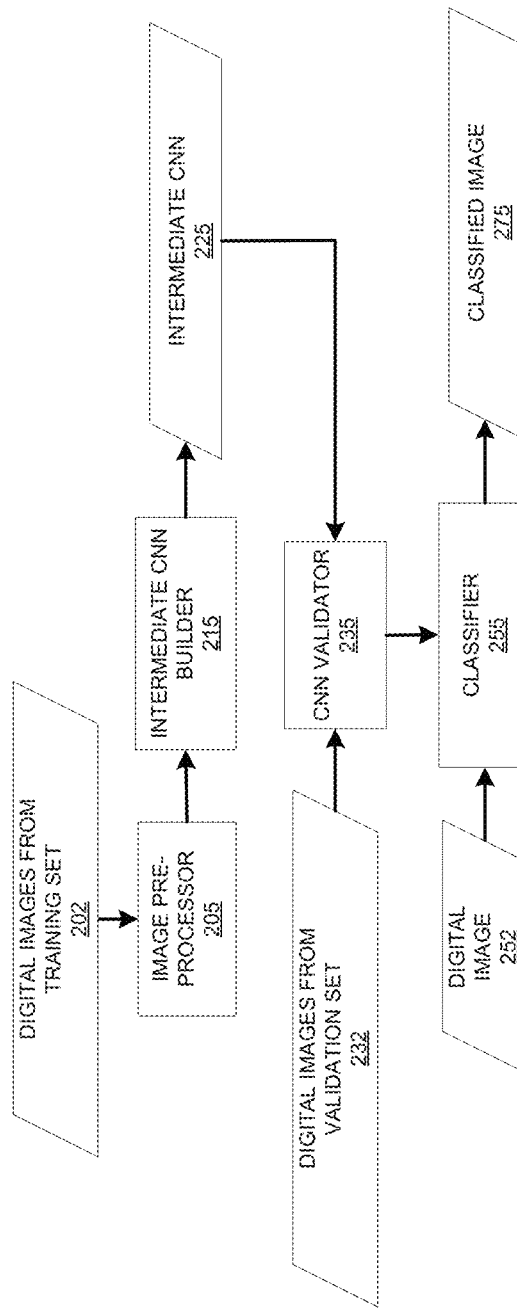
FIG. 2 illustrates a classification trainer for counterfeit detection, according to an example.

FIG. 2 illustrates a classification trainer for counterfeit detection, according to an example. As shown, an example of operations for generating one or more classifiers 255 is depicted. It should be appreciated that one example may include operations performed by the image extractor CNN builder 115 and the image attribute CNN builder 116 to build the image extractor CNN 120 and the image attribute CNN 121. The training sets may include supervised or semi-automated training sets that include labeled data objects, which are used to train the CNNs to generate the classifiers 255, such as the image extractor CNN 120 and the image attribute CNN 121. The image processing server 130, for example, may receive digital images 202 from a labeled training set at an image pre-processor 205. The image pre-processor may crop and enhance particular content in the images from the training set to input into intermediate CNN builder 215. The intermediate CNN builder 215 may select various architectures and parameters to train an intermediate CNN 225. The intermediate CNN 225 may then be evaluated on digital images 232 in a validation set. CNN validator 235 may determine whether to flag the intermediate CNN 225 as meeting a designated validation threshold. If the intermediate CNN 225 does not meet the validation threshold, the intermediate CNN 225 may not be flagged and may continue to be trained on the digital images 202 from the training set by the intermediate CNN builder 215. Shared weights of the CNN may be adjusted in an iterative process until the validation threshold is met. When the intermediate CNN 225 meets the validation threshold, the intermediate CNN 225 may be selected as the classifier 255. The classifier 255 may be used to classify digital images, such as digital image 252, into a class or category 275. The classification may be a prediction of whether the digital image belongs to the class or category. The prediction may be accompanied by a confidence value that indicates accuracy of the classification.

Figure 3A:
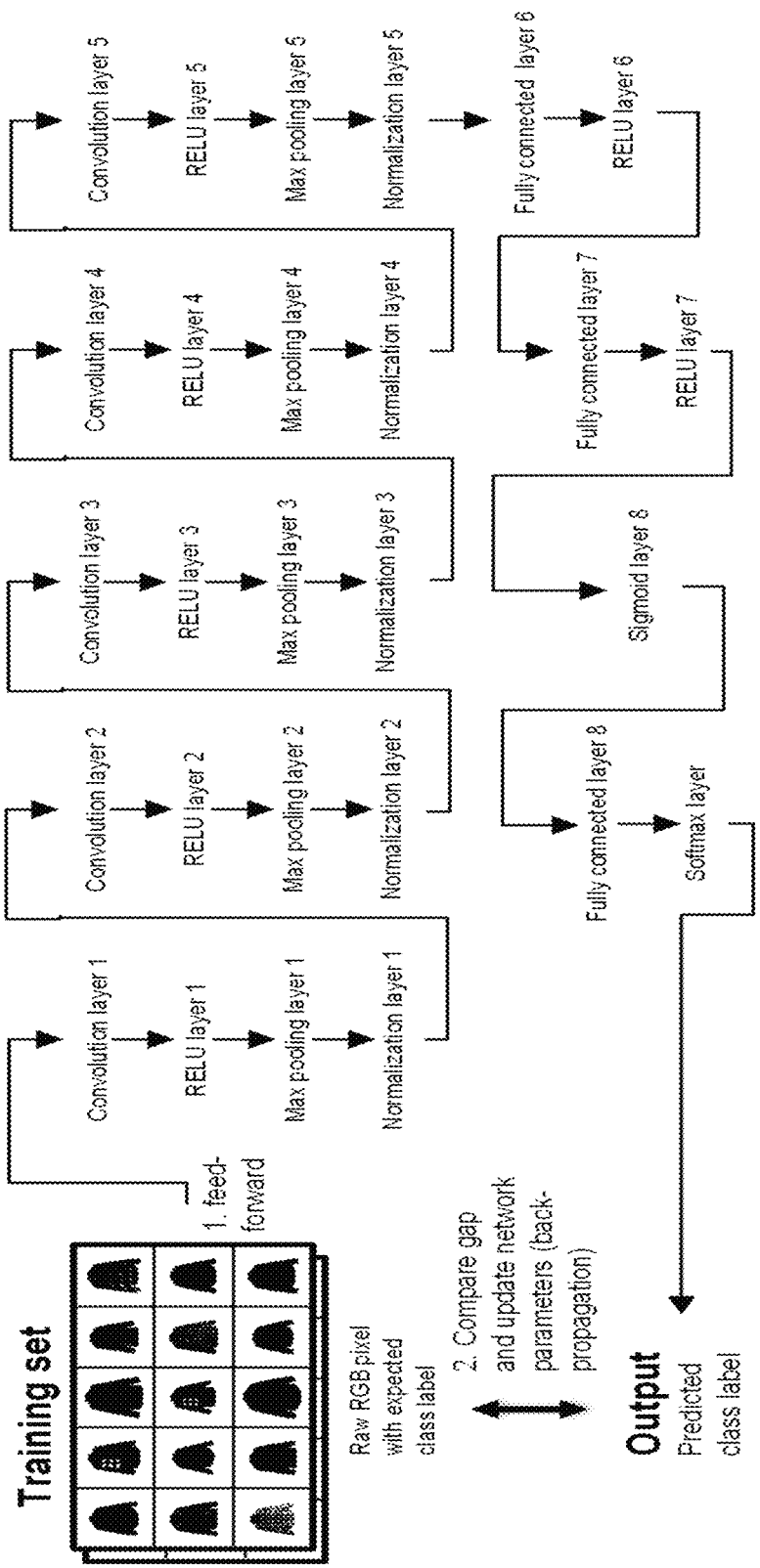
FIGS. 3A-3B illustrate an image attribute convolutional neural network for counterfeit detection, according to an example.
Figure 3B:
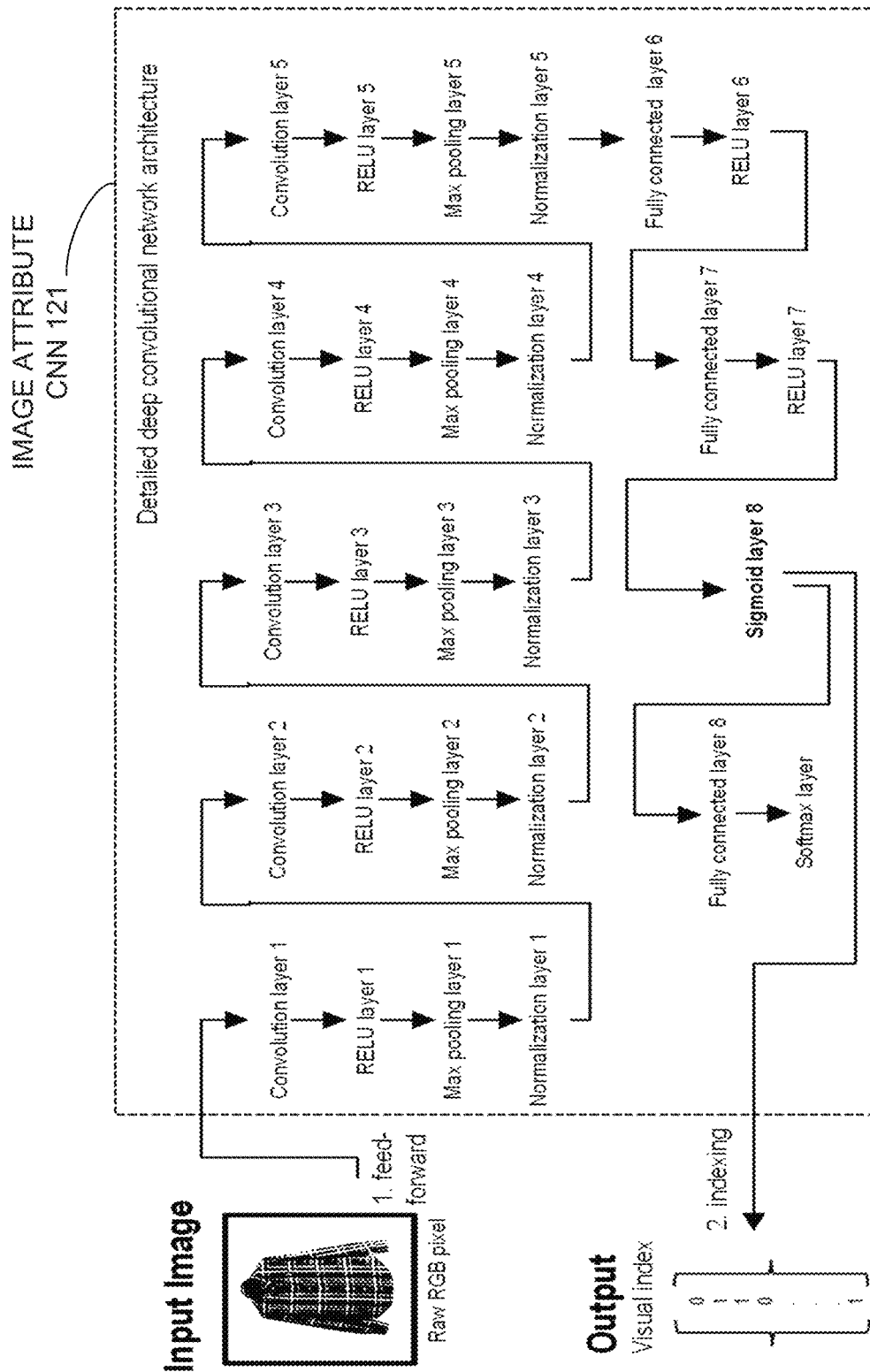

FIGS. 3A-3B illustrate an image attribute convolutional neural network (CNN) for counterfeit detection, according to an example. FIG. 3A shows an example of training a CNN to create the image attribute CNN 121. Each image in the training set for training the CNN includes a class label. To train the CNN, network parameters for the CNN may be initialized. Predetermined parameter models may be available that specify initial network parameters. Training data may be input into the initialized CNN to calculate predictions of classes for the images of the training set. The difference between the expected classes, which are specified for each image and the predicted classes, may be determined and used to update the network parameters with a back-propagation function. This process may be iterated until a satisfactory prediction rate is achieved to create the image attribute CNN 121.

As shown in FIG. 3A, the image attribute CNN 121 for example includes a number of convolutional and subsampling layers followed by fully connected layers. The input to a convolutional layer is a m×m×r image where m may be the height and width of the image, and r may be the number of channels, e.g. an RGB (red, green, blue) image has r=3. The convolutional layer may have k filters (or kernels) of size n×n where n is smaller than the dimension of the image. The size of the filters may give rise to the locally connected structure, which may each be convolved with the image to produce k feature maps of size m−n+1 (supposing the stride=1 and padding=0). Each map may then be sub-sampled typically with mean or max pooling over p×p contiguous regions where p may range between 2 for small images and N (N>=5) for larger inputs. Either before or after the subsampling layer, an additive bias and rectified linear unit (RELU) layer may be applied to each feature map.

Once the CNN is trained to create the image attribute CNN 121, the image attribute CNN 121 may be used to index visual features of the extracted image 151 as shown in FIG. 3B. For example, the output of the "sigmoidal layer 8" may be used as the visual index of the extracted image 151, and includes a binarized vector, such as [0 1 1 0 . . . 1], representing the visual features (also referred to as the attributes) of the extracted image 151. For example, the binarized vector may represent an index of visual features $x_i$ determined from a previous layer (e.g., RELU layer 7) that are binarized to 0 or 1. For example, for each visual feature x, a value of 0 or 1 may be determined based on whether $x_i$ is greater than or equal to a threshold (e.g., $x_{i=1}$) or less than the threshold (e.g., $x_{i=0}$). The threshold may be selected by maximizing the classification accuracy on training data. Images to be compared to an extracted image may also be run through the image attribute CNN 121 to determine a binarized vector of attributes for each image, and the binarized vectors may be stored in the data repository 175. The binarized vector of attributes for the extracted image 151 may be compared to the binarized vectors of attributes for other images to identify similar images. Hamming distance between two binarized vectors of equal length may be a number of positions at which the corresponding symbols are different. For example, H([0 11],[1 1 1])=1; and H([0 0 1],[1 1 1])=2. Comparisons that have the smallest hamming distances may yield the images that are most similar to the extracted image 151.

Figure 4:
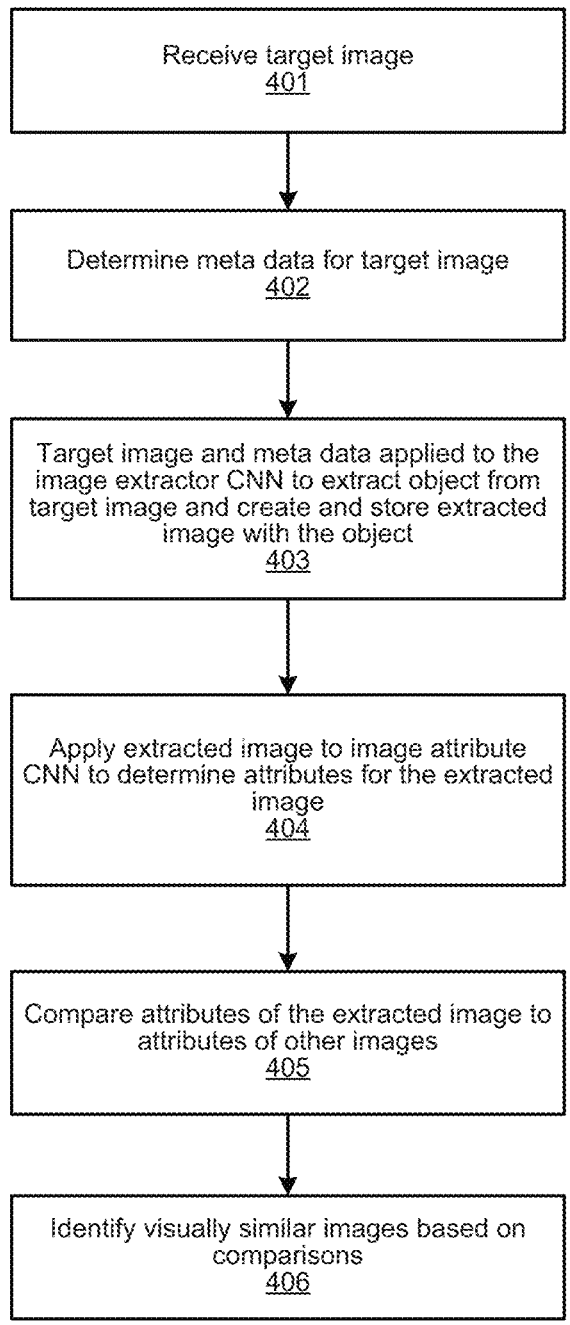
FIG. 4 illustrates a flow chart of a method to identify visually and textually similar content for counterfeit detection, according to an example.

FIG. 4 illustrates a flow chart of a method 400 to identify visually and textually similar content for counterfeit detection, according to an example. The method 400 is provided by way of example, as there may be a variety of ways to carry out the method described herein. Although the method 400 is primarily described as being performed by system 100 as shown in FIG. 1, the method 400 may be executed or otherwise performed by other systems, or a combination of systems. Each block shown in FIG. 4 may further represent one or more processes, methods, or subroutines, and one or more of the blocks may include machine-readable instructions stored on a non-transitory computer readable medium and executed by a processor or other type of processing circuit to perform one or more operations described herein.

At block 401, the target image 150 may be received by the image processing server 130. At block 402, metadata for the target image may be determined. The metadata for example may identify a class of an object in the target image 150. The metadata may be provided with the file containing the target image 150 or may be provided in a web site containing the target image 150 if the target image 150 is obtained from a web site. In an example, the metadata may be used to identify a particular CNN for determining the extracted image 151 from the target image. For example, if the CNN 120 comprises multiple CNNs trained to identify objects in different classes, the metadata may be used to identify a class of objects associated with the target image 150, and the class of objects may be used to identify a particular CNN associated with the class. The target image 150 may be applied to the identified CNN to determine the extracted image 151. In some situations, metadata may not be available or the metadata may not identify a class or include information that can identify a particular CNN to use. In these situations, the target image 150 may be applied to multiple CNNs. The output with a highest confidence value may be selected to extract the extracted image 151 or if none of the outputs has a satisfactory confidence value, such as determined by comparing to a threshold, then no image may be extracted.

At block 403, the target image 150 and the metadata may be applied to the image extractor CNN 120 to extract an object from the target image 150 if the target image 150 includes an object in a particular class of objects that the image extractor CNN 120 was trained to identify, as described above.

At block 404, the extracted image 151 may be applied to the image attribute CNN 121 to determine attributes for the extracted image 151. For example, a binarized vector of image features are determined by the image attribute CNN 121 for the extracted image 151.

At block 405, the attributes of the extracted image 151 may be compared to attributes of other images. For example, the binarized vector of image features for the extracted image 151 is compared to binarized vector of image features for other images to find images that are similar to the extracted image 151.

At block 406, visually similar images are identified based on the comparisons performed at block 405. Visual similarity may be based on similarity of features of images visible to the human eye. Similarity may also be determined based on a mathematical comparison of attributes (e.g., visual features), such as based on calculated Hamming distances. They may also be based on data associated with one or more images (e.g., metadata, user input data, etc.). For example, "similar" images may include images that are a closest match when comparing the attributes of the extracted image 151 and the attributes of the stored images. If Hamming distance is used for the comparisons, then images with the smallest Hamming distances may be considered similar images. A Hamming distance threshold may be set such that if an image has a Hamming distance greater than the threshold, then the image is not considered a similar image to the extracted image 151. Other processing techniques or similarity analysis may also be provided depending on various application or use.

Figure 5A:
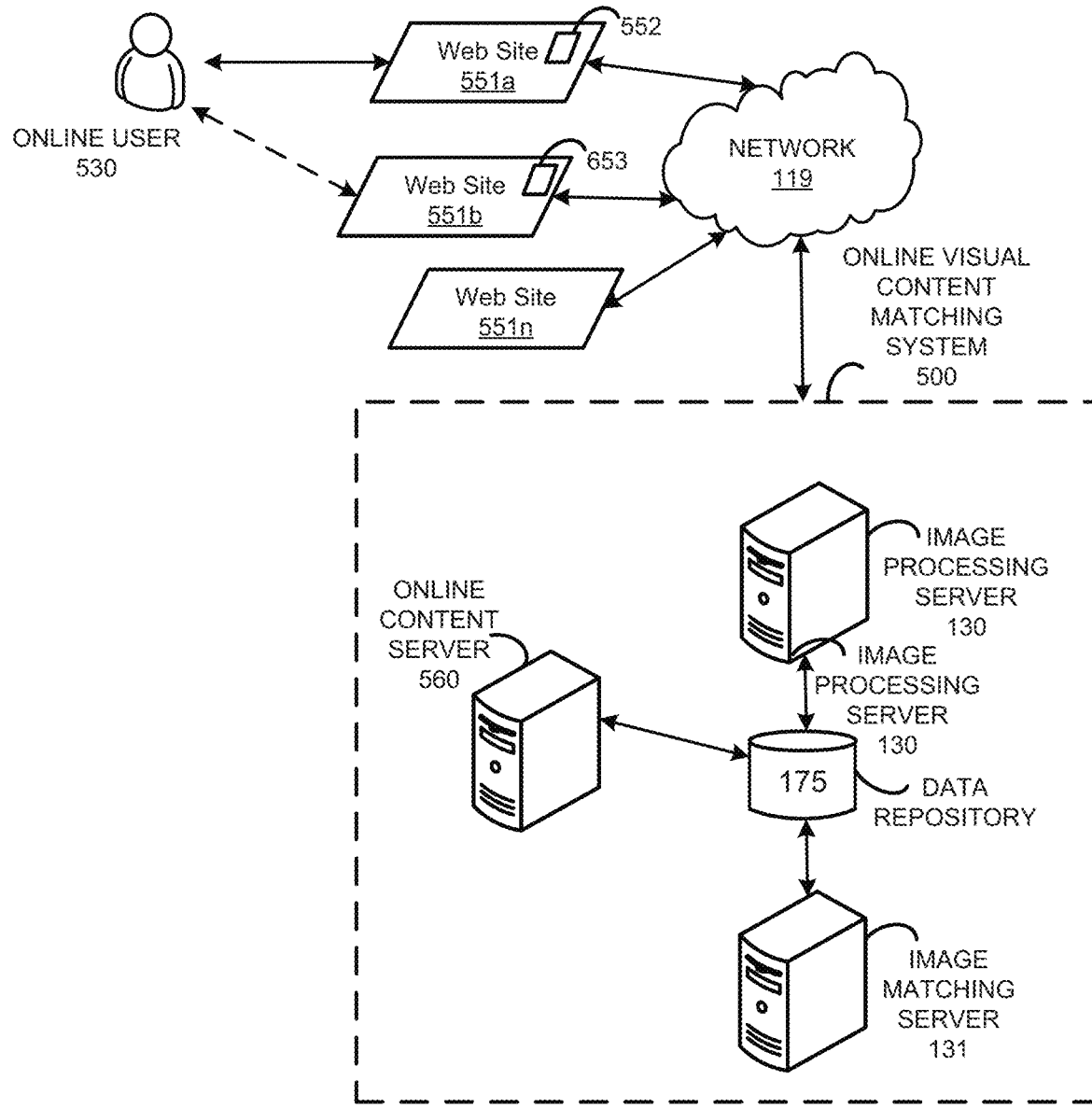
FIG. 5A illustrates a web-based content matching system for counterfeit detection, according to an example.

The counterfeit detection system 100 may be used for a variety of applications. One example of an application of the system 100 may be to identify and determine visually similar content on one or more web sites. FIG. 5A illustrates a web-based content matching system for counterfeit detection, according to an example. FIG. 5A shows an example of an online visual content matching system 500 that may include the system 100. For example, the online visual content matching system 500 may include the image processing server 130, the image matching server 131 and the data repository 175 of the system 100, which is described with respect to FIG. 1. The online visual content matching system 500 may also include an online content server 501 which is further described below, and the network 119 includes the Internet. The online visual content matching system 500 can identify content viewed by an online user visiting a website, and identify stored content similar to the web site content viewed by the online user. The similar content may be delivered to the online user via the Internet. Although described in the context of web browsing or targeted advertisements, the image matching techniques may be useful for counterfeit detection discussed below.

Figure 5B:
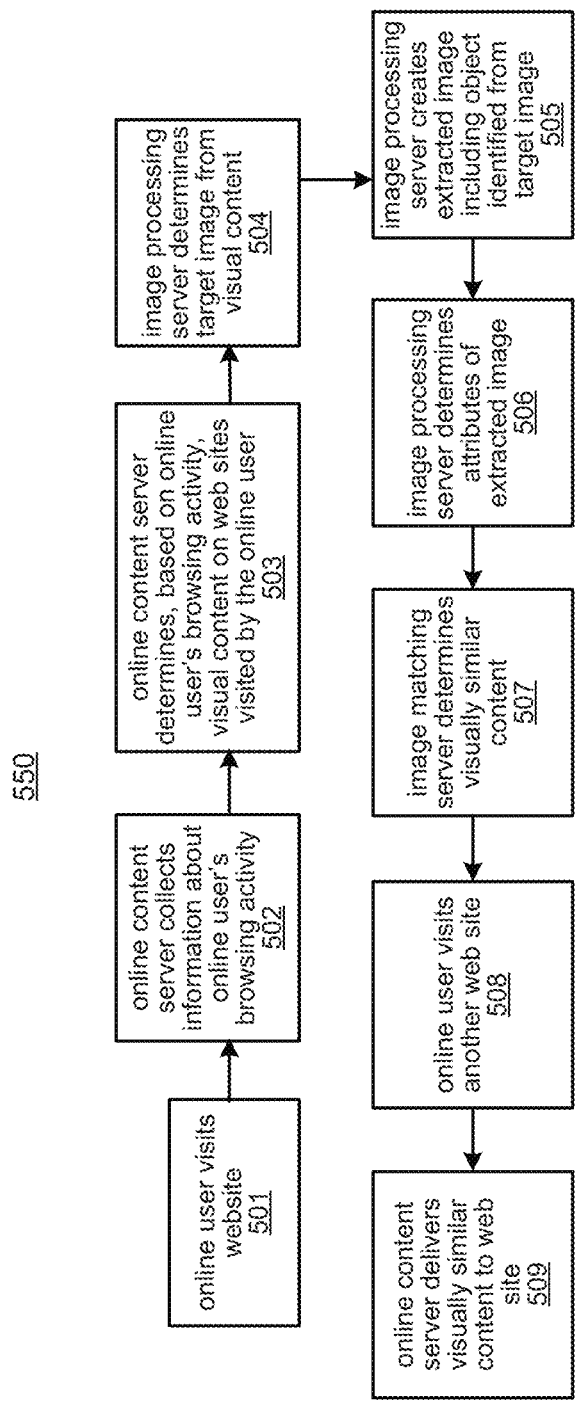
FIG. 5B illustrates a flow chart of a method to identify visually and textually similar content for counterfeit detection, according to an example.

FIG. 5B illustrates a flow chart of a method to identify visually and textually similar content for counterfeit detection, according to an example. FIG. 5B shows an example of a method 550 performed by an online user and the online visual content matching system 500. The method 550 is provided by way of example, as there may be a variety of ways to carry out the method described herein. Although the method 550 is primarily described as being performed by system 500 as shown in FIG. 5A, the method 550 may be executed or otherwise performed by other systems, or a combination of systems. Each block shown in FIG. 5B may further represent one or more processes, methods, or subroutines, and one or more of the blocks may include machine-readable instructions stored on a non-transitory computer readable medium and executed by a processor or other type of processing circuit to perform one or more operations described herein.

Referring to FIGS. 5A-5B, at block 501, online user 530 may visit a web site, such as web site 551a. At block 502, the online content server 560 may collect information about the online user's browsing activity. At block 503, the online content server 560 may determine, based on the online user's browsing activity, visual content on the web sites visited by the online user 530 and which may have been clicked on or otherwise viewed by the online user 530. The visual content may be the visual content 552 displayed on the web site 551a. A cookie may be used to determine the visual content according to the online user's browsing activity. For example, a cookie may be stored in the online user's browser that can track the online user's browsing activity. The cookie may be a third party cookie that can be sent to the online content server 560 to determine the browsing activity, including browsing history, of the online user 530. The cookie may identify visual content 552 viewed or clicked on by the online user 530 at the web site 551a. Also, the cookie may identify the uniform resource locator (URL) of web sites visited by the online user 530. The online content server 560 may identify the visual content displayed on the web sites, such as by parsing the code, e.g., HyperText Markup Language (HTML) or other types of code, of the web sites. For example, the visual content 552 displayed on the web site 551a may be identified from the cookie or by parsing the code of the web site 551a to identify images or image files. The visual content associated with the browsing activity of the online user 530 may be stored in the data repository 175.

At block 504, the image processing server 130 determines the target image 150 from the visual content, e.g., visual content 552, determined at 503. For example, the visual content 552 may be an image provided in a GIF file or another type of file. The file is read to determine the target image 150.

At block 505, the image processing server 130 may create the extracted image 151 including an object identified from the target image 150. For example, the image extractor CNN 120 may identify an object from the visual content 552, and the object is cropped from the target image 150 to create the extracted image 151. At block 506, the image attribute CNN 121 may determine extracted image attributes 160 for the extracted image 151.

At block 507, the image matching server 131 may determine visual content similar to the visual content 552. For example, the extracted image attributes 160 may be compared to image attributes of other images to find images similar to the visual content 552. For example, visual content 553 may be identified as similar content to the visual content 552. The identified similar content may be referred to as the visually similar content. The similar content (e.g., images, text, or other multimodal data) determined at 507 may be images that are similar but are not exact matches or are not the same image previously viewed or clicked on by the online user 530. If the same image or the same online advertisement including the same image is repeatedly delivered to the online user 530, the online user 530 may ignore it. The image matching server 131 may identify similar images stored in the data repository 175 and filter out images that are considered to be the same as the extracted image, e.g., the same as the visual content 552.

At 508, the online user 530 may visit another web site, such as the web site 551b. At 509, the online content server 560 may deliver the visually similar content, e.g., visual content 553, to the web site 551b. The tracking cookie may be used to determine the current web site visited by the online user 530. The visual content 553 may be displayed in the web site 551b to the online user 530. The visually similar content may also be displayed on the web site 551a if the online user 530 remains at the web site 551a instead of moving to the web site 551b, or may be displayed at any web site the online user 530 visits if the web site has the ability to display visual content delivered by the online content server 560.

According to an example, the visual content 552 may be an image of a product viewed by the online user 530 at the web site 551a. The online visual content matching system 500 may be used to identify visually similar content to the image of the product viewed by the online user 530 at the web site 551a. For example, FIGS. 6A-6B illustrates an identification of visually and textually similar content, according to an example.

Figure 6A:
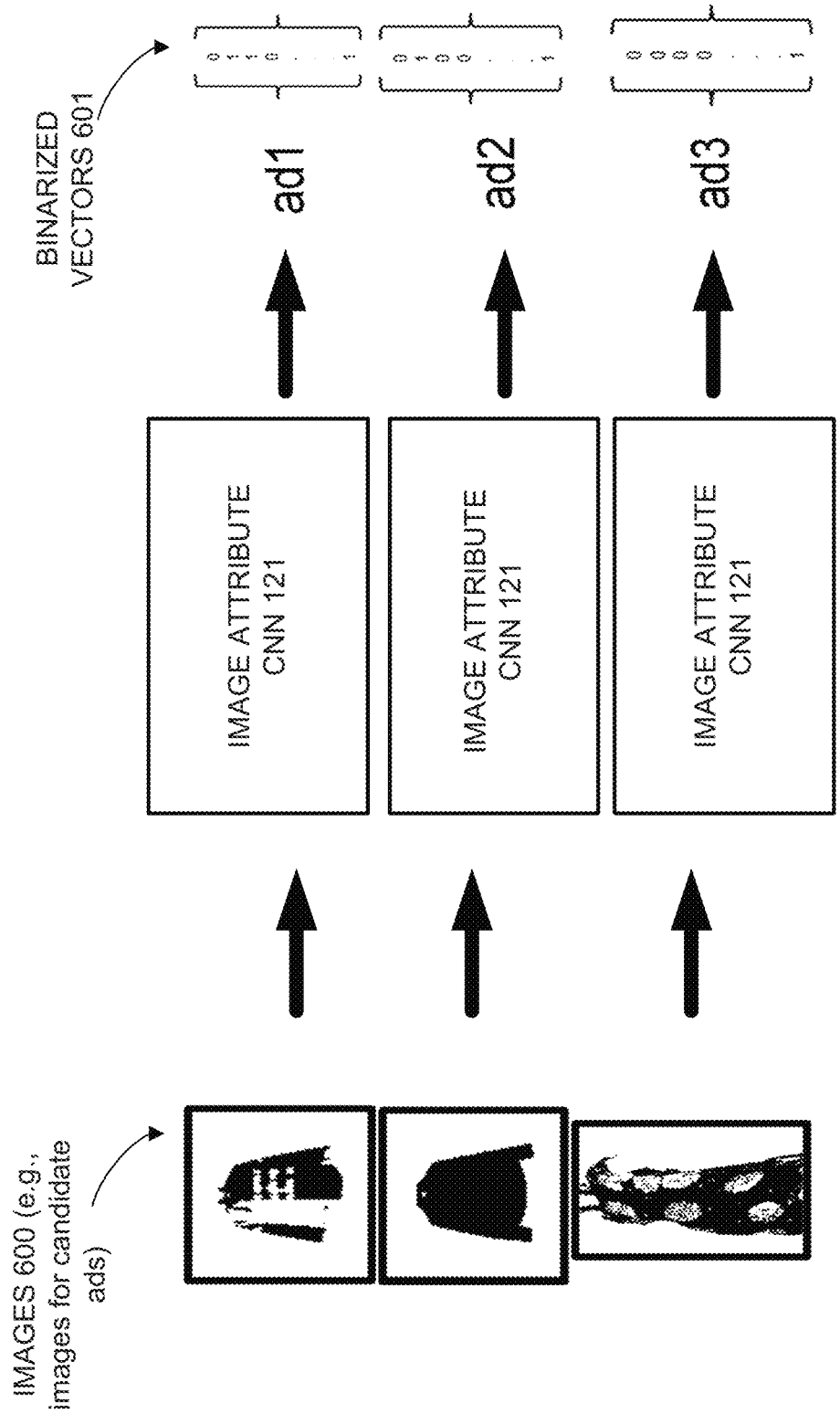
FIGS. 6A-6B illustrate an identification of visually and textually similar content, according to an example.
Figure 6B:
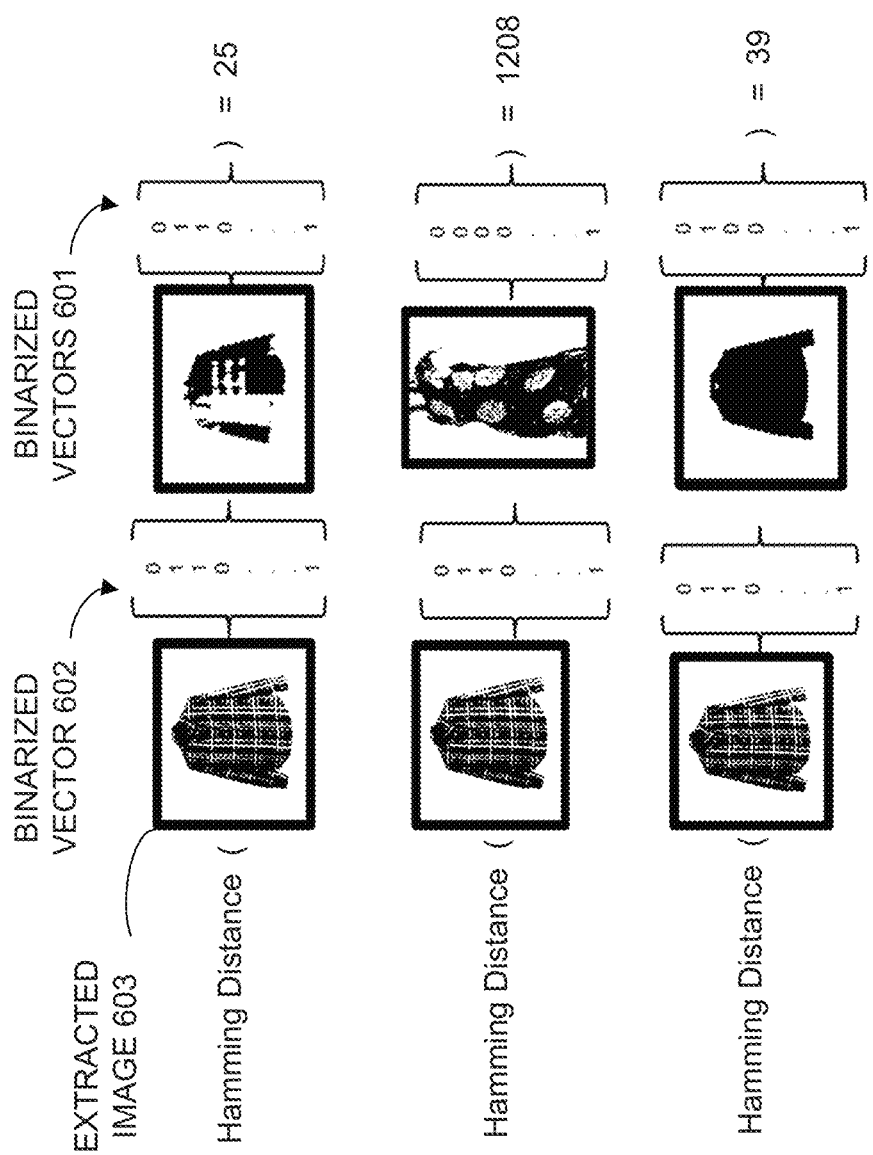

As shown in FIG. 6A, images 600 may include images for candidate online advertisements or for candidate product recommendations that may displayed to online user 530. Again, while discussions are directed to advertisement and product recommendations, the techniques for image matching and image analysis may be applicable to counterfeit detection described in more detail below. An online advertisement may include a web page including at least one image. The images 600 are provided as input to the image attribute CNN 121 to determine the binarized vectors 601, such as [0 1 1 0 . . . 1], etc., representing the visual features (also referred to as the attributes) of the images 600. The images 600 and/or the binarized vectors 601 may be stored in the data repository 175. FIG. 6B shows an extracted image 603, which may be an image of a product viewed by the online user 530 at the web site 551a. The extracted image 603 is provided as input to the image attribute CNN 121 to determine the binarized vector 602, representing the visual features (also referred to as the attributes) of the extracted image 603. The binarized vectors 601 of the images 600 are compared to binarized vector 602 of the extracted image 603 to identify a closest matching image that is not the same image. For example, the comparison may include determining Hamming distances, and the Hamming distances are shown. The closest matching image is the image with a Hamming distance of 25. An online advertisement or a product recommendation including the closest matching image (e.g., visually similar content) may be presented to the online user 530. The visually similar content may be products that look similar to the product viewed at the web site 551a but are different. For example, while the online user 530 is at the web site 551a, the visually similar content may be delivered to the web site 551a and presented to the online user 530, so the online user 530 may be able to view products similar to the product displayed in the visual content 552. Also, the visually similar content may be delivered to a different web site, such as the web site 551b, when the online user 530 visits the web site 551b.

Figure 7:
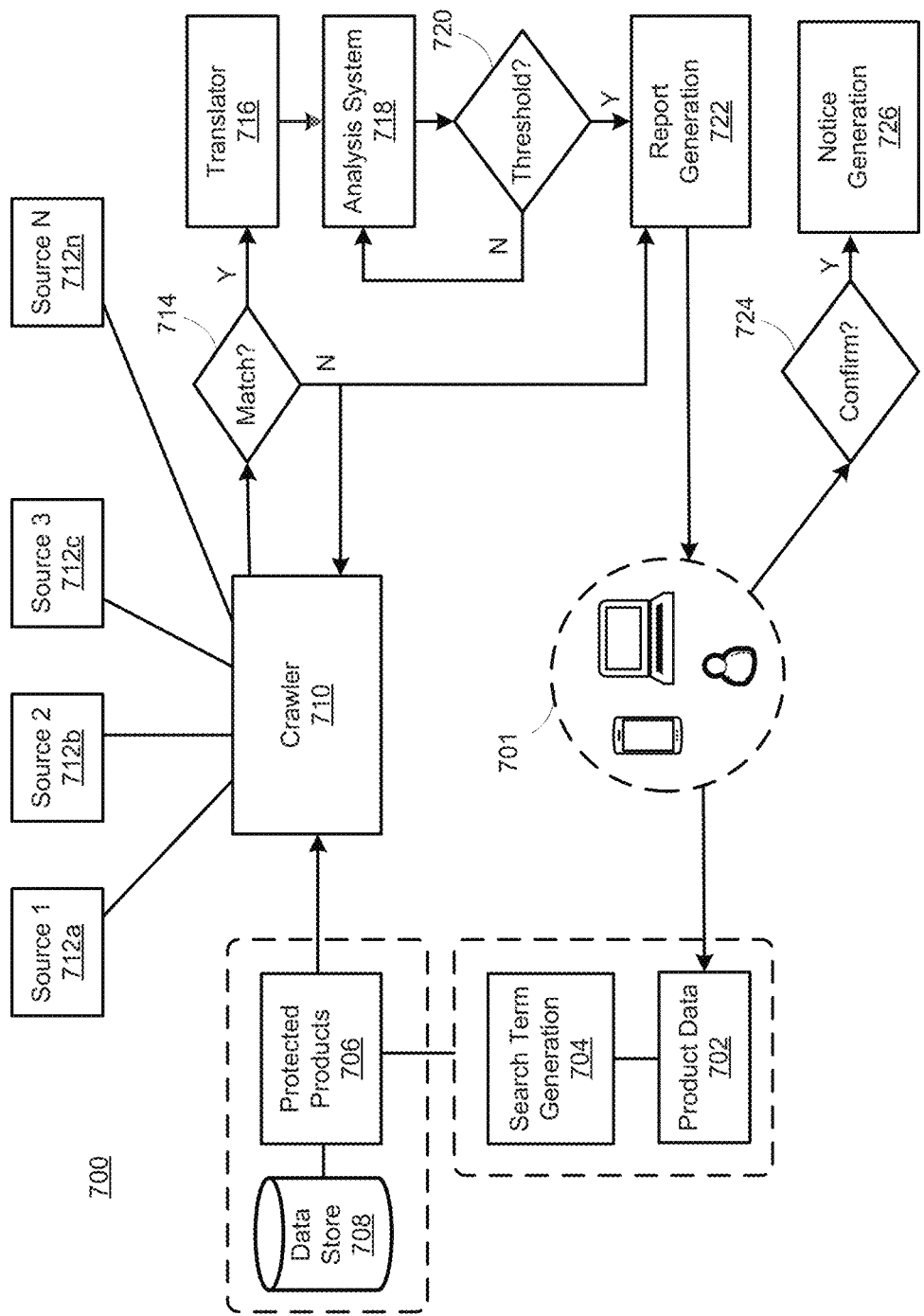
FIG. 7 illustrates a counterfeit detection system using machine learning and analysis of visual and textual data, according to an example.

Putting this all together, FIG. 7 illustrates a counterfeit detection system 700 using machine learning and analysis of visual and textual data, according to an example. A user, at his or her computing device 701, may interact with a portal to submit a product data 702 for counterfeit review. For example, the user 701 may be a manufacturer of goods or a marketplace retailer of general merchandise interested in seeing whether the goods they make or sell is being counterfeited.

In this case, the user 701 may have a designed and produced a unique lamp with particular design feature (e.g., a spiral leg) that appeals globally to customers. Perhaps this lamp has been so popular that counterfeits of this lamp with its unique spiral legs are being sold at various marketplaces and web sites. The user may submit information, such as image, data, video, or other multimodal data associated with the product of interest (e.g., lamp) as product data 702. Using search term generation 704, the product data 702 may be transformed into search terms or key words for searching. Search term generation 704 may be multilingual, employing one or more translation applications or services to translate into the search terms to multiple languages or one language of choice.

While this example is directed to lamp with a unique design feature, it should be appreciated that the user may submit any product for counterfeit search or detection. This may include handbags with noticeable logos or brands, wristwatches, furniture, automobiles, or other product with identifiable features. It should also be appreciated that product data 702 and search term generation 704 may utilize natural language processing (NLP) or other processing/analysis techniques to convert any multimodal information into one particular usable format. For instance, if only images, videos, or audio files are submitted by the user, these systems may convert these non-textual files into text using NLP or other similar techniques to generate search key terms. These search key terms may therefore function as a first order of filtering (e.g., coarse filtering) in the search for counterfeit items, as discussed herein.

Once search key terms are generated by the search term generator 704, this information may be used to identify one or more protected products 706. Additionally or alternative, this information may be used to create a description or profile of one or more protected products 706, which may be shared across various platforms by multiple parties. A data store 708 may also be used to store data associated with one or more protected products before a counterfeit search is conducted. Referring back to the example of the lamp with unique leg design, all the search key terms generated based on the product data may be organized at the protected products and used by a crawler 710 to find, identify, and gather similarly identified products at one or more sources 712a, 712b, 712c, . . . 712n. These sources 712a, 712b, 712c, . . . 712n may include various marketplace web sites, forums, or locations for sale of merchandise. In the example of the lamp, these sources 712a, 712b, 712c, . . . 712n may include marketplace web sites, such as Etsy, Amazon, Alibaba, etc. Other various websites or marketplace forums may be provided depending on the type of protected product for which counterfeit detection is provided. For example, these may include non-tradition forums for sale of goods on mobile chat rooms, etc. Thus, sources 712a, 712b, 712c, ... 712n may include any web-based or mobile forum where sale of goods may take place.

In effect, the crawler 710 may use the search key terms categorized by the protected products 706 to identify potential matches of that protected product. For instance, the crawler 710 may identify several lamps with unique leg designs being offered for sale on Etsy, Amazon, and Alibaba. Even though Alibaba may be hosted in a non-English language, the multilingual search term generation 704 may convert the protected product search terms into that non-English language. Once these various lamps with unique legs are identified from these marketplaces web sites as a match 714, generally via key terms searches, the information associated with these potential counterfeits may be identified and/or pulled for additional processing. If there are no matches 714, a report may be generated to explain to the user its findings. The crawler 710 may also be configured to run continuously and periodically at predetermined intervals. Alternatively, the crawler 710 may be configured to continue searching for other (possibly broader) potential counterfeit items.

It should be appreciated that the crawler 710 may an Internet bot that systematically browses the World Wide Web. It should be appreciated that the crawler 710 may also employ various web scraping techniques. These may include gathering data from various web feeds and may include data from various web sources, such as social media, syndication, aggregators, etc. Because counterfeit items may not always be offered for sale in traditional web-based marketplaces, web scraping may be useful way to see if counterfeit items are being sold in alternative fashion. For instance, this may also include RSS feeds, which allow users to access updates to online content. Data from social media may also include any type of internet-based application built upon creation and exchange of user-generated content, which may include information collected from social networking, microblogging, photosharing, news aggregation, video sharing, livecasting, virtual worlds, social gaming, social search, instant messaging, or other interactive media sources. Scraping may include web scraping, web harvesting, data scraping, or other techniques to extract data from websites or other Internet sources. These techniques may involve fetching (e.g., downloading content or data from a web page) and extraction (e.g., parsing, searching, reformatting, copying, compiling, monitoring, etc.) of data. Other forms of scraping may also include document object model (DOM) parsing, computer vision, and natural language processing (NLP) to simulate human browsing to enable gathering web page content for offline parsing. It should also be appreciated that the crawler 710 may also validate hyperlinks and HTML code, and have uses in other forms of data-driven programming.

Once at least one match for similar products is identified by the crawler 710, textual data associated the at least one match for similar products may be translated to a user language. A translator 706 may take the potential matches and translate the crawled data to user language. The user language may be a language is more compatible with other systems and platforms. For example, this user language may be a language that can be used to report to a user, other systems, or other useful platform. For instance, the user language may be useful in report generation for a user interesting in finding a counterfeit item.

At this point, an analysis may be performed on the identified potential counterfeit items by an analysis system 718. It should be appreciated that the analysis system may be or include at least parts of system 100, as well as various image attribute, comparison, and/or matching features, described herein. For instance, the analysis system 718 may use image processing and analysis to the determine if the at least one match for similar products comprises at least one or more potential counterfeit items. In one example, identifying the potential counterfeit items using the image processing and analysis may be based on feature identification using image attributes. As disclosed herein, the image processing and analysis may use image attribute machine learning classifiers train and improve counterfeit detection based on computer vision analysis modeling or other similar techniques.

It should also be appreciated that identification of the one or more potential counterfeit items to using the image processing an analysis may be achieved by meeting a predetermined threshold 720 for the feature identification using image attributes. If the potential counterfeit items do not meet a predetermined threshold (e.g., having a particular quality/quantity of similarity), the analysis system 718 may continue to analyze the data, or the crawler 710 may continue to search. Alternatively, a report may be generated by a report generator 722 and transmit to the user 701 that no potential matches or counterfeit items were found based on the submitted product data.

If potential counterfeit items meet the predetermined threshold, a report may be generated by the report generator 722 to inform the user 701 of these counterfeit items and other information associated with these counterfeit items. These may include who is selling these counterfeits, what web source is hosting this sale, where they are making these counterfeits, how many are being offered, a history of such activity, etc. Other various information or data may also be provided.

If the user confirms that these potential counterfeit items are in fact counterfeit 724, the system may generate a takedown notice, via the report generator 722 or a notice takedown generator 726. This takedown notice may be generated using the translated user language. It may also be sent to the web source that was identified as hosting the sale of the counterfeit item. In some examples, the takedown notice may be automatically generated in the event counterfeit items are identified based on the analysis system. In this way, the user 701 may be able to efficiently request cease and desist of such counterfeit actions by infringing parties.

Figure 8:
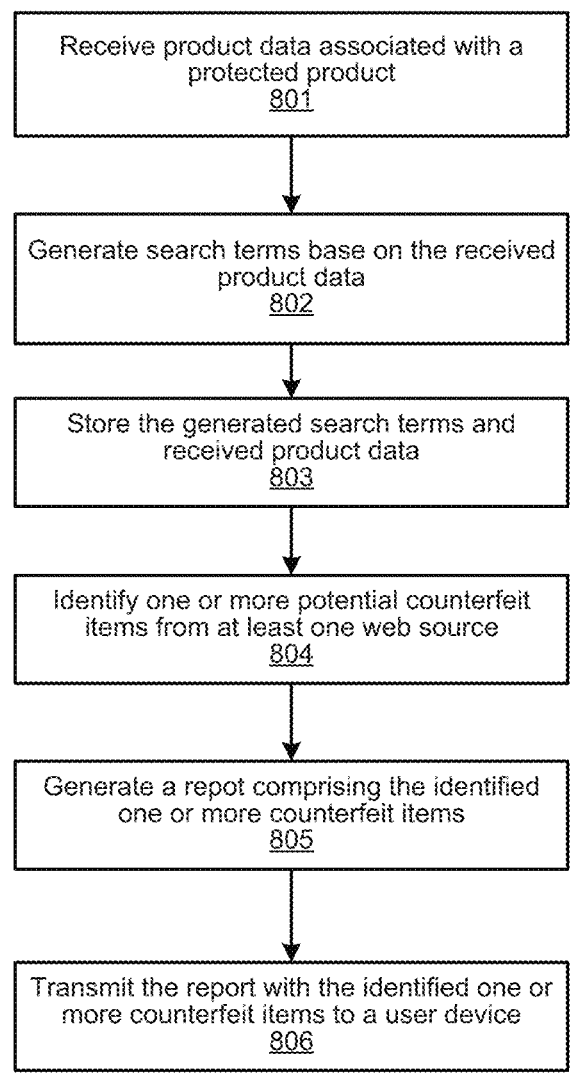
FIG. 8 illustrates a flow chart of a method for counterfeit detection using machine learning and analysis of visual and textual data, according to an example.

FIG. 8 illustrates a flow chart of a method for counterfeit detection using machine learning and analysis of visual and textual data, according to an example. The method 800 is provided by way of example, as there may be a variety of ways to carry out the method described herein. Although the method 800 is primarily described as being performed by system 100 as shown in FIG. 1 or system 700 as shown in FIG. 7, the method 800 may be executed or otherwise performed by other systems, or a combination of systems. Each block shown in FIG. 8 may further represent one or more processes, methods, or subroutines, and one or more of the blocks may include machine-readable instructions stored on a non-transitory computer readable medium and executed by a processor or other type of processing circuit to perform one or more operations described herein.

At block 801, the system 700 may receive, at a data access interface, product data associated with the protected product from a user device. The user device may include a mobile device (e.g., smart phone, computing device, etc.), a server, a database, an enterprise resource planning (ERP) system, a web site, or other data source. The product data may be multimodal data that describes the protected product. For example, the protected product may be a three-dimensional product comprising notable features, such as a lamp with a unique leg configuration. Here, the multimodal data may include an image, as well as textual data associated with the image, that describes a lamp having those and other notable features of the protected product.

At block 802, the system 700 may generate, at a search term generator, search terms based on the received product data. In an example, the search term generator may use a translator. One of the features of the translators may be to convert the generated search terms into a language used by at least one web source. In some examples, the web source may be an online marketplace, such as Etsy, Amazon, Alibaba, or other online marketplace. The web source may be any web-based platform that is offering for sale items, some of which may include counterfeit items.

At block 803, a data repository may store the generated search terms and the received product data associated with the protected product. In this way, any previously submitted protected product may be more readily identifiable for current or future use in counterfeit detection.

At block 804, the system 700 may identify, at a processor, one or more potential counterfeit items from at least one web source based on the generated search terms and the received product data associated with the protected product. This may be achieved in a number of ways. In one example, the processor may use a crawler obtain data associated with similar products from the at least one web source. The crawler may identify other similar products from multiple web sources by using the generated search terms and the received product data associated with the protected product. Once similar products are identified, the crawler may pull that information or data. If not, the crawler may be configured to run continuously and periodically at predetermined intervals.

Once at least one match for similar products is identified by the crawler based on the crawling technique, textual data associated the at least one match for similar products may be translated to a user language. This user language may be a language that can be used to report to a user, other systems, or other useful platform.

The processor may also use image processing and analysis to the determine if the at least one match for similar products comprises at least one or more potential counterfeit items. This process may involve the image processing discussed above. For instance, identifying the potential counterfeit items using the image processing and analysis may be based on feature identification using image attributes. As disclosed herein, the image processing and analysis may use image attribute machine learning classifiers train and improve counterfeit detection based on computer vision analysis modeling or other similar techniques. It should also be appreciated that identification of the one or more potential counterfeit items to using the image processing an analysis may be achieved by meeting a predetermined threshold for the feature identification using image attributes.

At block 805, the system 700 may generate a report, by a report generator, that includes the identified one or more counterfeit items. At block 806, an output interface may transmit the report to a user device. In another example, the output interface may transmit the report to a data store for other use, e.g., analytics, etc. In some examples, a user at the user device may review the report and confirm that the identified one or more counterfeit items. Upon confirmation that the identified one or more counterfeit items, the system 700 may also generate a takedown notice. This takedown notice may include the user language from the translator that identifies the potential counterfeit items based at least on feature identification using image attributes. The takedown notice, for example, may be transmitted to an administrator of the at least one web source to give notice that the web source is distributing counterfeit items and request a cease and desist of such activities.

Other helpful applications may be provided by the examples described herein. For example, using computer-enabled vision analysis may enhance various machine learning systems that perform natural language processing (NLP) and auto-tagging for an image matching process. The NLP and auto-tagging may be used to enhance the image similarity determinations. For example, the image processing systems may be "trained" by submission of more product data. This may be an interactive process, e.g., through a mobile application, to obtain an image and supplemental user input from a user to execute an image search. The supplemental user input may be provided from a user as speech or text, and NLP is performed on the supplemental user input to determine user intent and additional search attributes for the image search. Using the user intent and the additional search attributes, the system may perform enhanced image matching on stored images that are tagged with attributes through an auto-tagging process. Once a sufficient amount of product data is obtained from a user, the system may also use that information to acquire other information from third party sources to build a product data library. All of this may enhance identification of unique image attributes corresponding to a protected product. In an example, the stored images may include images of products, and the enhanced image matching may be performed to identify matching product images that may be used for enhance counterfeit detection, as well as other uses including product recommendations for online shopping or other e-commerce. Accordingly, the system described herein may facilitate an improved and interactive method for providing product identification based on enhanced image searching.

It should also be appreciated that the counterfeit detection system 100 may also provide other components not shown. These may include gateways, servers, or other interfaces that may perform and run analytics in order to decrease time, expense in data delivery, and perhaps even taking immediate action at equipment. In many ways, the system may then provide real-time or near real-time analytics to simplify the analytics process and increase responsiveness and efficiency.

It should be appreciated that the components of the system described herein may operate in partial or full capacity, or it may be removed entirely. It should also be appreciated that data analytics and processing techniques described below with respect to the analytics system, for example, may also be performed partially or in full by other various components of the overall system.

It should be appreciated that the data stores described herein may include volatile and/or nonvolatile data storage that may store data and software or firmware including machine-readable instructions. The software or firmware may include subroutines or applications that perform the functions of the data security and protection system 100 and/or run one or more application that utilize data from the data security and protection system 100. Other various server components or configurations may also be provided.

There may be several examples of hardware that may be used for the servers, layers, subsystems, and components of the analytics system or the over counterfeit detection system 100. For example, the processor may comprise an integrated circuit, and may execute software or firmware or comprise custom processing circuits, such as an application-specific integrated circuit (ASIC) or field-programmable gate array (FPGA). The data access interface and output interface may be any number of hardware, network, or software interfaces that serves to facilitate communication and exchange of data between any number of or combination of equipment, protocol layers, or applications. For example, the data access interface and output interface may each include a network interface to communicate with other servers, devices, components or network elements via a network in the system 100.

It should be appreciated that a layer, as described herein, may include a platform and at least one application. An application may include software comprised of machine-readable instructions stored on a non-transitory computer readable medium and executable by a processor. The systems, subsystems, and layers shown in FIG. 1 may include one or more servers or computing devices. A platform may be an environment on which an application is designed to run. For example, a platform may include hardware to execute the application, an operating system (OS), and runtime libraries. The application may be compiled to run on the platform. The runtime libraries may include low-level routines or subroutines called by the application to invoke some of behaviors, such as exception handling, memory management, etc., of the platform at runtime. A subsystem may be similar to a platform and may include software and hardware to run various software or applications.

It should be appreciated that a single server is shown for each of the gateway, servers, and/or other elements within the systems, layers, and subsystems of the systems described herein. However, it should be appreciated that multiple servers may be used for each of these servers, and the servers may be connected via one or more networks. Also, middleware (not shown) may be included in systems as well. The middleware may include software hosted by one or more servers. Furthermore, it should be appreciated that some of the middleware or servers may or may not be needed to achieve functionality. Other types of servers, middleware, systems, platforms, and applications not shown may also be provided at the back-end to facilitate the features and functionalities counterfeit detection system.

Although applications of machine learning and image and textual processing and analysis described herein are directed mainly to counterfeit detection, it should be appreciated that that the systems may also use these and other various techniques in content-based recommendation engines, advertisements, market research, law enforcement, supply chain management and operations, intelligent chatbots, dynamic risk analysis, and other types of knowledge management systems. The counterfeit detection systems described herein may provide a more comprehensive and flexible approach to counterfeit identification, detection, and remediation.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A system for counterfeit detection, comprising:
   one or more data stores that store and manage data within a network;
   one or more servers that facilitate operations using information from the one or more data stores;
   a machine learning processing system that communicates with the one or more servers and the one or more data stores in the network to provide counterfeit detection of a protected product, the machine learning processing system comprising:
   a data access interface that receives product data associated with the protected product from the one or more data stores or from a user device, wherein the product data comprises multimodal data that describes the protected product;
   a search term generator that generates search terms based on the received product data, wherein the search term generator uses a translator to convert the generated search terms into one of English language or a non-English natural language used by at least one web source;
   a processor that identifies one or more potential counterfeit items from at least one web source based on the generated search terms and the received product data associated with the protected product by:
   using a crawling technique to obtain data associated with similar products from the at least one web source;
   identifying at least one match for similar products based on the crawling technique wherein the at least one match includes at least a target image with an image of the protected product;
   creating an extracted image including the protected product by cropping the target image;
   translating textual data associated with the at least one match for similar products to a user language that is different from the natural language used by the at least one web source; and
   using image processing data from the extracted image and analysis of the textual data to determine if the at least one match for similar products comprises at least one or more potential counterfeit items;
   a report generator to generate a report comprising the identified one or more counterfeit items; and
   an output interface to transmit the report with the identified one or more counterfeit items to the one or more data stores or the user device.

2. The system of claim 1, wherein the machine learning processing system further comprises a data repository to store the generated search terms and the received product data associated with the protected product.

3. The system of claim 1, wherein the protected product is a three-dimensional product comprising notable features, and wherein the multimodal data comprises at least one image and textual data associated with the at least one image that describes at least in part the notable features of the protected product.

4. The system of claim 1, wherein the user device comprises at least one of a mobile device, a server, a database, an enterprise resource planning (ERP) system, and a web site.

5. The system of claim 1, wherein the at least one web source comprises an online marketplace.

6. The system of claim 1, wherein the crawling technique is based at least in part on textual analysis using the generated search terms against products provided by the at least one web source.

7. The system of claim 6, wherein the crawling technique runs continuously and periodically at predetermined intervals.

19

8. The system of claim 1, wherein identifying the potential counterfeit items using the image processing and analysis is based at least on feature identification using image attributes, and wherein the image processing and analysis uses image attribute machine learning classifiers.

9. The system of claim 8, wherein identification of the one or more potential counterfeit items to using the image processing an analysis is achieved by meeting a predetermined threshold for the feature identification using image attributes.

10. The system of claim 1, wherein upon confirmation of the identified one or more counterfeit items, the report generator generates a takedown notice using the user language identifying the potential counterfeit items based at least on feature identification using image attributes, and wherein the output interface transmits the takedown notice to an administrator of the at least one web source.

11. The system of claim 1, wherein to create the extracted image including the protected product, the processor is to:
   obtain a prediction regarding presence of the image of the protected product in the target image from an image extractor that includes a convolution neural network (CNN);
   identify a bounding box that surrounds a portion of the target image including the protected product;
   crop the target image around the bounding box; and
   store a resulting image as the extracted image of the protected product.

12. A machine learning processing system for counterfeit detection, comprising:
   a data access interface that receives product data associated with a protected product from a user device, wherein the product data comprises multimodal data that describes the protected product;
   a search term generator that generates search terms based on the received product data, wherein the search term generator uses a translator to convert the generated search terms into one of English language or a non-English natural language used by at least one web source;
   a data repository that stores the generated search terms and the received product data associated with the protected product;
   a processor that identifies one or more potential counterfeit items from at least one web source based on the generated search terms and the received product data associated with the protected product by:
   using a crawling technique to obtain data associated with similar products from the at least one web source;
   identifying at least one match for similar products based on the crawling technique wherein the at least one match includes at least a target image with an image of the protected product;
   creating an extracted image including the protected product by cropping the target image;
   translating textual data associated with the at least one match for similar products to a user language that is different from the natural language used by the at least one web source;
   using image processing data from the extracted image and analysis of the textual data to determine if the at least one match for similar products comprises at least one or more potential counterfeit items; and
   generate a report comprising the identified one or more counterfeit items; and
   an output interface to transmit the report with the identified one or more counterfeit items to the user device.

20

13. The system of claim 12, wherein:
   the protected product is a three-dimensional product comprising notable features;
   the multimodal data comprises at least one image and textual data associated with the at least one image that describes at least in part the notable features of the protected product; and
   the at least one web source comprises an online marketplace.

14. The system of claim 12, wherein:
   identifying the potential counterfeit items using the image processing and analysis is based at least on feature identification using image attributes;
   the image processing and analysis uses image attribute machine learning classifiers; and
   identification of the one or more potential counterfeit items to using the image processing an analysis is achieved by meeting a predetermined threshold for the feature identification using image attributes.

15. The system of claim 12, wherein upon confirmation of the identified one or more counterfeit items, the processor generates a takedown notice using the user language identifying the potential counterfeit items based at least on feature identification using image attributes, and wherein the output interface transmits the takedown notice to an administrator of the at least one web source.

16. A method for detecting counterfeit items, comprising:
   receiving, at a data access interface, product data associated with a protected product from a user device, wherein the product data comprises multimodal data that describes the protected product;
   generating, by a search term generator, search terms based on the received product data, wherein the search term generator uses a translator to convert the generated search terms into one of English language or a non-English natural language used by at least one web source; and
   identifying, by at least one processor, one or more potential counterfeit items from at least one web source based on the generated search terms and the received product data associated with the protected product by:
   using a crawling technique to obtain data associated with similar products from the at least one web source;
   identifying at least one match for similar products based on the crawling technique wherein the at least one match includes at least a target image with an image of the protected product;
   translating textual data associated with the at least one match for similar products to a user language that is different from the natural language used by the at least one web source;
   using image processing data from the extracted image and analysis of the textual data to determine if the at least one match for similar products comprises at least one or more potential counterfeit items;
   generating a report comprising the identified one or more counterfeit items; and
   transmitting, by an output interface, the report with the identified one or more counterfeit items to the user device.

17. The method of claim 16, wherein:
   the protected product is a three-dimensional product comprising notable features;
   the multimodal data comprises at least one image and textual data associated with the at least one image that describes at least in part the notable features of the protected product; and the at least one web source comprises an online marketplace.

18. The method of claim 16, wherein the crawling technique is based at least in part on textual analysis using the generated search terms against products provided by the at least one web source, and wherein the crawling technique runs continuously and periodically at predetermined intervals.

19. The method of claim 16, wherein:
identifying the potential counterfeit items using the image processing and analysis is based at least on feature identification using image attributes;
the image processing and analysis uses image attribute machine learning classifiers; and
identification of the one or more potential counterfeit items to using the image processing an analysis is achieved by meeting a predetermined threshold for the feature identification using image attributes.

20. The method of claim 16, wherein upon confirmation of the identified one or more counterfeit items, the method further comprises:
generating, by the processor, a takedown notice using the user language identifying the potential counterfeit items based at least on feature identification using image attributes; and
transmitting, by an output interface, the takedown notice to an administrator of the at least one web source.

21. A non-transitory computer-readable storage medium having an executable stored thereon, which when executed instructs a processor to perform the method of claim 16.

* * * * *